(12) United States Patent
Kennedy et al.

(10) Patent No.: US 6,520,069 B2
(45) Date of Patent: Feb. 18, 2003

(54) PISTON PIN FOR INTERNAL COMBUSTION ENGINE

(75) Inventors: Lawrence Charles Kennedy, Bingham Farms, MI (US); Theodor Ira Freiheit, Ann Arbor, MI (US)

(73) Assignee: Detroit Diesel Corporation, Detroit, MI (US)

( * ) Notice: Subject to any disclaimer, the term of this patent is extended or adjusted under 35 U.S.C. 154(b) by 26 days.

(21) Appl. No.: 09/770,488

(22) Filed: Jan. 29, 2001

(65) Prior Publication Data

US 2002/0100364 A1 Aug. 1, 2002

(51) Int. Cl.[7] ................................................. F16J 1/14
(52) U.S. Cl. ................................... 92/187; 92/216
(58) Field of Search ........................ 92/187, 216, 217, 92/238

(56) References Cited

U.S. PATENT DOCUMENTS

| | | | | |
|---|---|---|---|---|
| 2,051,305 A | * | 8/1936 | Valley et al. ................ 92/187 |
| 3,575,089 A | * | 4/1971 | Smith ......................... 92/187 |
| 4,358,881 A | * | 11/1982 | Mahrus et al. ............... 92/219 |
| 4,640,641 A | * | 2/1987 | Edelmayer .................. 403/150 |
| 5,289,758 A | * | 3/1994 | Berlinger .................... 92/216 |

* cited by examiner

*Primary Examiner*—Edward K. Look
*Assistant Examiner*—Thomas E. Lazo
(74) *Attorney, Agent, or Firm*—Brooks & Kushman P.C.

(57) ABSTRACT

In a piston engine, end play of the piston pin can be prevented without unduly shortening the pin. In the simplest design (FIG. 4), a full length piston pin can have spherical end surface in close clearance spacing relative to the combustion chamber surface, so that any tendency of the pin to shift along the pin axis is immediately resisted by contact between a spherical end surface and the combustion chamber surface. The area of each spherical surface is sufficient to prevent wear or scratching of the combustion chamber surface.

An alternative full length piston pin design incorporates spherical sheet-metal caps snapped in place at the ends (FIG. 2), which fix the pin (and caps) from coming into contact with the cylinder bore wall.

3 Claims, 2 Drawing Sheets

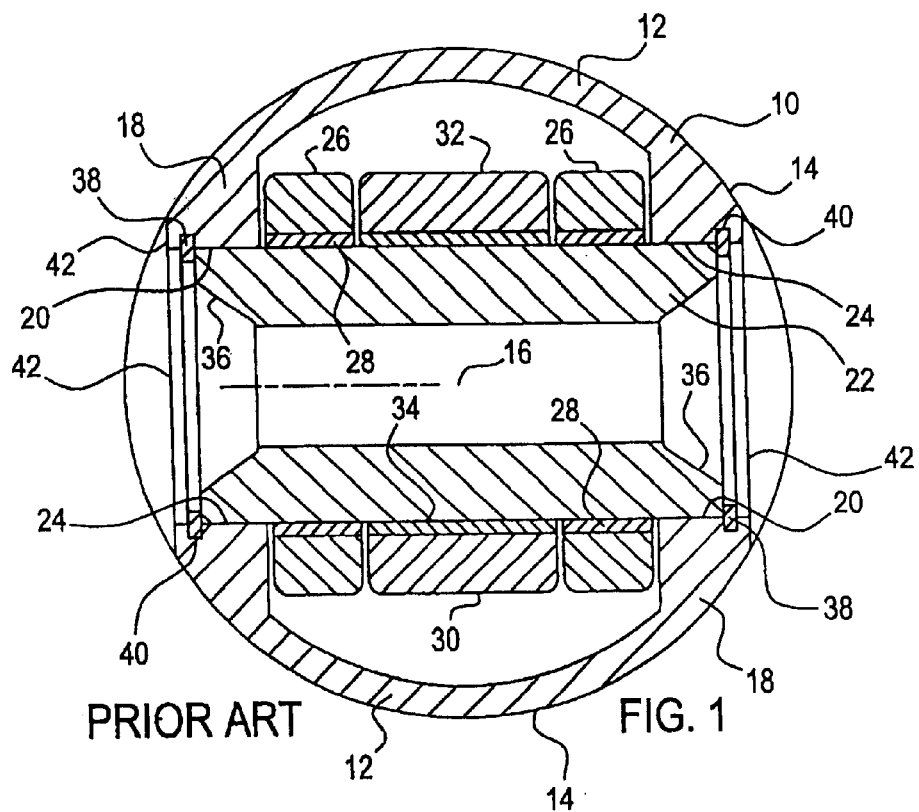
PRIOR ART    FIG. 1
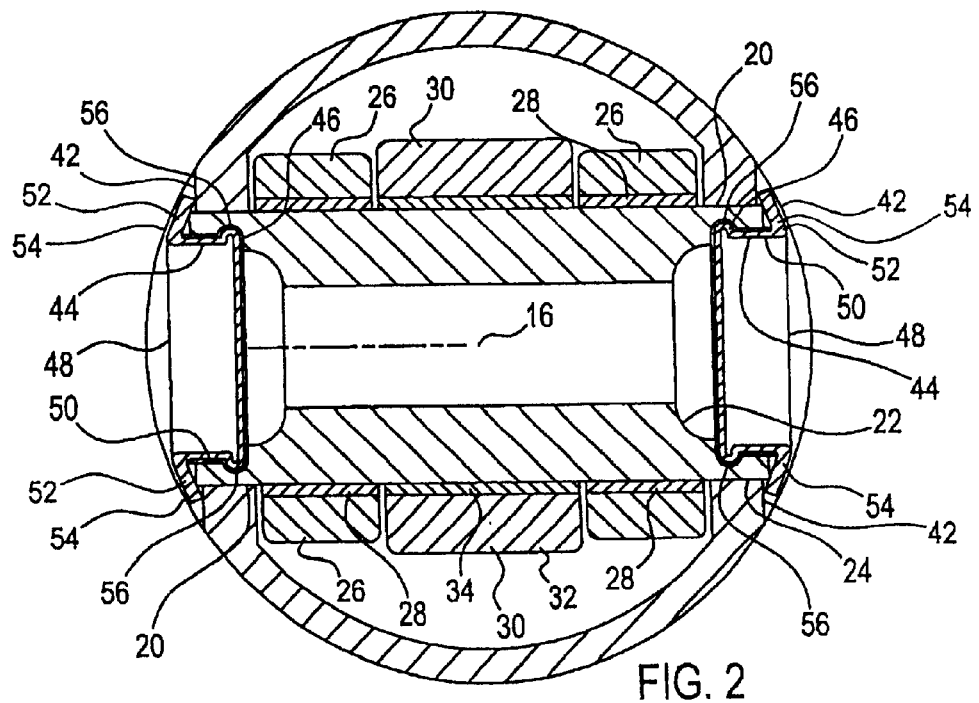
FIG. 2

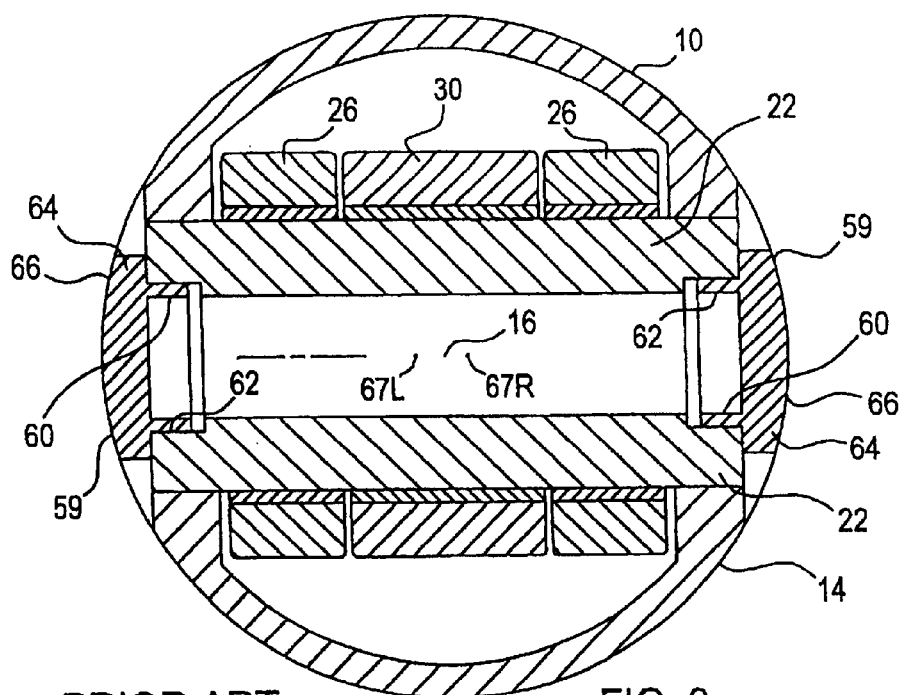
PRIOR ART    FIG. 3
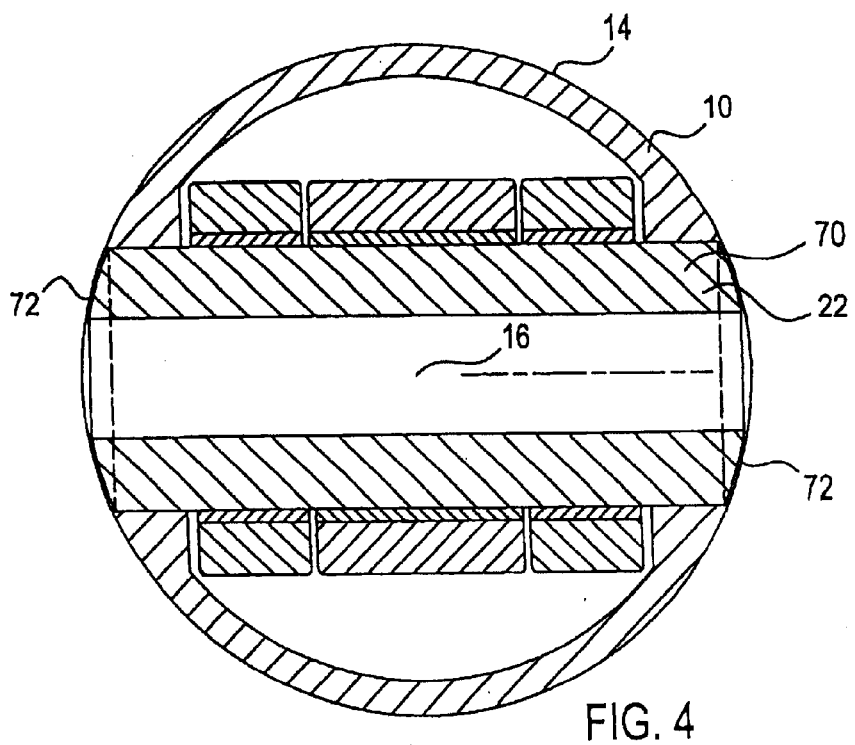
FIG. 4

PISTON PIN FOR INTERNAL COMBUSTION ENGINE

BACKGROUND AND SUMMARY OF THE INVENTION

This invention relates to internal combustion engines, and more particularly to a piston construction having improved means for restricting end play of the pin that connects the piston to an associated connecting rod. The invention can be used in spark—ignition gasoline engines or pressure—ignition diesel engines.

In many internal combustion engines the pistons are operatively connected to the associated connecting rods by piston pins. Each piston pin extends through aligned openings in the piston and the connecting rod, to establish a pivotal connection between the rod and piston. As the engine crankshaft rotates, one end of each connecting rod orbits around the drive shaft axis. The other end of the connecting rod has a swivel motion around the pin within the piston, whereby each connecting rod delivers power between the crankshaft and each associated piston. Each piston pin serves as a pivotal connection between the connecting rod and piston.

In one particular piston design the piston is an articulated piston having a two piece construction. A major component of the piston forms the piston head and the piston skirt. Struts extending down from the piston head forms two spaced bearings for the piston pin. One end of an associated connecting rod extends into the space between the bearings, whereby the piston pin can be extended through the end of the connecting rod and the spaced bearings, to form a pivotal connection between the connecting rod and piston.

In order to install the piston pin in the piston the pin has to be moved into its final position after the connecting rod is inserted into the piston. Typically, the piston has aligned openings in the piston side wall to permit the piston pin to be inserted into the piston. The piston has a floating orientation in the aligned bearings in the piston and connecting rod, such that the pin can shift on the pin axis so as to possibly contact the surface of the combustion cylinder. Such contact is undesirable in that the cylinder surface can wear or degrade. Minute metal particles formed by the wear action can generate further wear of the cylinder surface.

To prevent shifting (or play) of the piston pin it is a common practice to provide snap rings at the ends of the pin. Each snap ring fits into an annular groove in an opening in the piston side wall to form an obstruction at an end surface of the piston pin. The piston pin is located between the two snap rings so that the pin cannot shift along the pin axis.

The snap rings perform the intended function. However, such snap rings utilize space along the piston pin axis, such that the pin is somewhat shortened. The relatively shorter pin reduces the available bearing length, which can undesirably reduce the expected service life of the piston or piston pin.

The present invention relates to a mechanism for reducing end play of the piston pin without unduly shortening the piston pin. The longer piston pin can result in a greater bearing length and bearing surface area.

In one form of the invention the mechanism for limiting end play of the piston pin includes two end caps secured to opposite ends of the pin. Each end cap has a spherical surface facing the side wall of the combustion cylinder. These spherical flanges extend beyond the piston diameter and are spaced apart by a distance that is slightly more than surfaces 42, 42 of FIG. 2 of the piston, so that any tendency of the piston pin to shift along the pin axis causes one of the flange surfaces to contact the piston wall 42. There is no contact with the cylinder wall. This method of retention also prevents the piston pin from falling out prior to piston assembly into the cylinder bore.

Each end cap includes a plug section telescoped into a recess in an end surface of the piston pin, whereby the cap is secured to the pin without unduly shortening the pin. The longer pin enables the piston to be designed so as to provide a relatively longer pin bearing length.

In another form of the invention, the mechanism for limiting pin end play involves forming the pin with spherical end surfaces. The spacing between these spherical surfaces is slightly less than the piston diameter, so that any tendency of the pin to shift along the pin axis causes one of the spherical surfaces to contact the cylinder side wall. Each spherical surface has sufficient area as to prevent wear of the cylinder wall or spherical surface. This form of the invention maximizes the length of the piston pin, but presents the problem of an unrestrained sub-assemble.

Further features of the invention will be apparent from the attached drawings and description of illustrative embodiments of the invention.

BRIEF DESCRIPTION OF THE DRAWINGS

FIG. 1 is a transverse sectional view taken through an engine piston pin retained against excessive end play by two snap rings, according to prior art practice.

FIG. 2 is a view taken in the same direction as FIG. 1, but showing two end caps for preventing end play of the piston pin, according to the present invention.

FIG. 3 is a view taken in the same direction as FIG. 2, but showing another end cap construction that is according to prior art.

FIG. 4 is a view taken in the a same direction as FIG. 2, but showing a one-piece piston pin having spherical end surfaces for preventing end play of the pin, according to the invention.

DESCRIPTION OF A PREFERRED EMBODIMENT OF THE INVENTION

Referring to FIG. 1, there is shown a piston skirt 10 of an articulated type piston usable in an internal combustion engine of conventional construction. The engine can be a spark—ignition gasoline engine or a pressure—ignition diesel engine. The piston depicted in FIG. 1 includes a side wall 12 of the piston skirt 10 having a cylindrical side surface 14 centered on the piston longitudinal axis 16. The associated combustion cylinder has a cylindrical surface that is a sliding fit on piston surface 14.

Side wall 12 of the piston skirt has two opposed enlarged areas 18 having aligned circular openings 20 adapted to receive therein a piston pin 22. These openings form circular bearing surfaces for the pin, whereby the pin can rotate in openings 20 while being supported against radial play or dislocation relative to the pin axis 24.

Combustion pressure loads are transmitted to the piston pin 22 by a piston head that includes two spaced support walls 26. Each support wall has a bushing 28 press fit therein to provide added bearing support for piston pin 22. Thus, pin 22 is supported by the inner surfaces of bushings 28 and by surfaces 24 of openings 20.

An associated connecting rod 30 has an annular end portion 32 equipped with a bushing 34 encircling the central area of pin 22, to form a swivel connection between pin 22 and the connecting rod. The non-illustrated end of the connecting rod is swivably connected to the engine crankshaft. Pin 22 forms a swivel connection between the connecting rod and piston skirt 10 and piston head support walls 26. The pin has a floating disposition within the piston. To minimize the mass of pin 22 the piston is formed as a tubular member. Also, the end surfaces of the pin are internally chamfered, as shown at 36.

End play of pin 22 along pin axis is prevented by two snap rings 38 inserted into annular grooves 40 machined into annular surface 24. Each snap ring has a c—shaped profile, whereby the snap ring can be compressed in the circumferential direction (by a suitable tool) for placement in the associated groove 40. The snap rings prevent shifting or play of pin 22 along pin axis.

One disadvantage of the FIG. 1 pin arrangement is the fact that the pin length is reduced by reason of snap rings 38. This reduced-pin length reduces the total bearing surface area for the pin, i.e. the bearing surface provided by surfaces 24, bushings 28, and bushings 34.

FIG. 2 shows a piston pin arrangement designed to provide a greater pin length and a correspondingly greater bearing surface area for the pin. The bearing surface area is increased by about eight percent, compared to the FIG. 1 bearing surface area. In contrast, the length of pin 22 in FIG. 1 is somewhat less than the distance between relief surfaces 42, due to the presence of snap rings 38 (in FIG. 1).

In FIG. 2, piston pin body 22 has two oppositely—facing cylindrical recesses 44 in its end surfaces. An annular groove 46 is formed in the side surface of each cylindrical recess 44. The recesses provide mechanisms for securing two end caps 48 to the pin body 22. As shown in FIG. 2, each end cap comprises a tubular plug section 50 locatable within the associated recess 44, and a radial flange 52 extending outwardly from plug section 50.

Each radial flange has a spherical surface 54 centered on a point along pin axis, at or near axis 16 of the piston. With this arrangement, spherical surfaces 54 follows closely the cylindrical side surface 14 of the piston. The caps require only a small axial space at each end of the skirt pin bore; enough to extend beyond the pin bore and make contact with the relieved vertical surface of the skirt, commonly referred to as the "skirt pin relief". End play motion of the piston pin causes retainer 50 to come into contact with surface 42 thereby limiting end play motion.

The hidden surface of each flange 52 abuts an edge of pin 22 so that each cap 48 is essentially rigid with respect to the pin. An annular protuberance 56 on plug section 50 extends into the associated groove 46, to lock each cap 48 against escape from pin 22, especially during initial assembly operations.

In FIG. 2 the piston pin comprises tubular member 22 and the two end caps 48. Spherical surfaces 54 on the end caps are spaced apart by a distance that is slightly less than the diameter of piston skirt 10. The area of each spherical surface 54 is sufficient to prevent significant wear of the cylinder wall or spherical surface, in the event that one of the caps should contact the wall.

FIG. 3 shows another end cap construction. Each end cap 59 has an annular plug section 60 adapted to have a press fit in a cylindrical recess 62 in an end of the tubular pin member 22. A flat hidden surface on flange 64 of the end cap abuts the end of tubular member 22 to limit insertional motion of plug section 60 into recess 62.. Each end cap has a spherical surface 66 adapted to face the combustion cylinder surface when the cap is installed on pin member 22. The radius of curvature of each spherical surface 66 is approximately the same as the radius of curvature of piston side surface 14. As shown in FIG. 3, the center of curvature of spherical surface 66 on the left end cap is designated by numbered 67L; the center of curvature of the spherical surface on the right end cap is designated by numeral 67R. The two spherical surfaces 66,66 are effectively spaced apart by a distance that is slightly less than the diameter of piston side surface 14.

In FIG. 3 the piston pin is defined by tubular member 22 and the two end caps 59. Spherical surfaces 66 effectively define the end surfaces of the piston pin.

Any tendency of the piston pin to shift along pin axis will cause one of the spherical surfaces 66 to contact the side surface of the combustion chamber, thereby limiting or preventing end play of the pin. The contacted area of the spherical surface 66 is sufficient to prevent any wear or scoring of the combustion chamber surface.

FIG. 4 shows a further form that the invention can take. The piston pin comprises a one—piece tubular member 70 having convex spherical end surfaces 72. Both spherical end surfaces 72 are centered on the midpoint of tubular member 70; in FIG. 4 the center point is coincident with axis 16 of piston 10. Due to the tubular nature of pin member 70, each spherical surface 72 is annular.

The radius of curvature of each spherical end surface 72 is slightly less than the radius of curvature of piston side surface 14, such that during normal engine operations the spherical surfaces 72 do not come into contact with the combustion cylinder. Typically, each spherical surface 72 will be spaced from the cylinder by about 0.001 to 0.003 inch, measured along pin axis 24.

Any tendency of pin 70 to shift along pin axis will cause one of the spherical surfaces 72 to come into contact with the combustion cylinder. The contact area of each spherical surface 72 is large enough that there will be no wear or scoring of the cylinder.

The drawings show two forms that the invention can take. However, it will be appreciated that the invention can take various forms and configurations. A principal feature of the invention is that the piston pin has spherical end surfaces normally spaced a minimal clearance distance from the combustion cylinder. The area of each spherical surface is large enough as to preclude any appreciable wear or scoring of the combustion cylinder surface in the event that the piston pin should start to shift along the pin axis.

FIG. 2 shows multi-piece piston pin construction, wherein the pin comprises an elongated tubular member and two end caps secured to opposite ends of the tubular member. FIG. 4 shows a one piece piston pin having spherical end surfaces. The invention can be practiced with any of these pin constructions.

The invention can be used in spark—ignition gasoline engines or in pressure—ignition diesel engines. However, it is expected that principal usage of the invention would be in high performance diesel engines having relatively high combustion chamber pressures.

What is claimed:

1. An improved piston pin for use in internal combustion engine piston assemblies comprising:

a tubular pin body having a length less than the engine cylinder surface diameter and greater than the distance between opposing skirt pin relief surfaces of the piston assembly, said tubular pin body having a pair of axial ends, an inner cylindrical recess in each of said axial ends, and an annular groove located within each of said cylindrical recesses, a pair of substantially cylindrical tubular plug end caps having one small end and one large end dimensioned correspondingly to said inner cylindrical recess walls so as to be receivable in said axial ends of said tubular pin body, said pair of end caps also having an annular protuberance located near the small end dimensioned correspondingly to said annular grooves located within said cylindrical recesses so as to be receivable in said annular grooves, and having a radial flange located on said large end and dimensioned correspondingly to extend beyond the tubular pin body and contact the skirt pin relief surfaces, said radial flanges thereby defining the ends of said piston pin.

2. An improved piston pin for use in internal combustion engine piston assemblies comprising:

a tubular pin body having a length slightly less than the outside diameter of the piston assembly, said tubular pin body having a pair of axial ends, said axial ends having convex spherical surfaces, said spherical surfaces having a center point coincident with the axis of the piston assembly and a radius less than the curvature of the piston side surface thereby preventing contact with a cylinder wall of said piston assemblies.

3. The invention as claimed in claim 2, wherein said tubular pin body axial end convex spherical surfaces are each from about 0.001 to about 0.003 inches from the cylinder.

\* \* \* \* \*